US011850109B2

(12) United States Patent
Leblanc et al.

(10) Patent No.: US 11,850,109 B2
(45) Date of Patent: Dec. 26, 2023

(54) SYSTEM AND DEVICES FOR MEASURING LIGHT SOURCES AND METHODS OF USE THEREOF

(71) Applicant: BlueLight Analytics, Inc., Halifax (CA)

(72) Inventors: Derek Leblanc, St. John's (CA); Chris Felix, Beaver Bank (CA)

(73) Assignee: BlueLight Analytics, Inc., Halifax (CA)

( * ) Notice: Subject to any disclaimer, the term of this patent is extended or adjusted under 35 U.S.C. 154(b) by 510 days.

(21) Appl. No.: 16/641,719

(22) PCT Filed: Aug. 27, 2018

(86) PCT No.: PCT/CA2018/051028
§ 371 (c)(1),
(2) Date: Feb. 25, 2020

(87) PCT Pub. No.: WO2019/036817
PCT Pub. Date: Feb. 28, 2019

(65) Prior Publication Data
US 2020/0375711 A1    Dec. 3, 2020

Related U.S. Application Data

(60) Provisional application No. 62/550,352, filed on Aug. 25, 2017.

(51) Int. Cl.
*G01J 1/04* (2006.01)
*G01J 1/42* (2006.01)
*A61C 13/15* (2006.01)

(52) U.S. Cl.
CPC .......... *A61C 19/004* (2013.01); *G01J 1/0422* (2013.01); *G01J 1/0474* (2013.01); *G01J 1/4209* (2013.01); *G01J 1/4257* (2013.01); *G01J 1/429* (2013.01)

(58) Field of Classification Search
CPC .... A61C 19/004; A61C 19/003; G01J 1/0422; G01J 1/0474; G01J 1/4209; G01J 1/4257; G01J 1/429; G02B 5/02; G06N 3/084
See application file for complete search history.

(56) References Cited

U.S. PATENT DOCUMENTS 6,437,861 B1    8/2002    Kuta
6,485,301 B1    11/2002   Gemunder et al.
(Continued)

FOREIGN PATENT DOCUMENTS

DE    2417399 A1    10/1975
JP    H5-280960 A   10/1993
(Continued)

OTHER PUBLICATIONS

Extended European Search Report for European Patent Application No. 18848555.1 dated Apr. 15, 2021 (9 pages).
(Continued)

*Primary Examiner* — Thanh Luu
(74) *Attorney, Agent, or Firm* — Clark & Elbing LLP (57) ABSTRACT

The invention provides a system and related equipment for the precise measurement of the output characteristic of a light source, e.g., a dental light curing unit (LCU) or light for photodynamic therapy, using a light collector, a light detector, and a computer programmed to deliver the value of the output characteristic of the light source to the user. The systems allow for the determination of a proper exposure time or the selection of a light source as needed for a specific application.

18 Claims, 10 Drawing Sheets

(56) References Cited

U.S. PATENT DOCUMENTS

| | | | |
|---|---|---|---|
| 7,729,941 B2 | 6/2010 | Zampini, II et al. | |
| 9,310,298 B2 | 4/2016 | Labrie et al. | |
| 9,693,845 B2 | 7/2017 | Price | |
| 10,113,906 B2 | 10/2018 | Labrie et al. | |
| 10,816,394 B2 | 10/2020 | Labrie et al. | |
| 2004/0101312 A1 | 5/2004 | Cabrera | |
| 2005/0200311 A1 | 9/2005 | Youle | |
| 2007/0036467 A1* | 2/2007 | Coleman | G06T 3/4061 |
| | | | 382/294 |
| 2007/0037113 A1 | 2/2007 | Scott et al. | |
| 2008/0062413 A1 | 3/2008 | Ashdown et al. | |
| 2010/0140450 A1 | 6/2010 | Duret et al. | |
| 2011/0108741 A1 | 5/2011 | Ingram | |
| 2012/0019819 A1 | 1/2012 | Messerchmidt | |
| 2012/0266740 A1* | 10/2012 | Hilbish | G10H 3/06 |
| | | | 84/645 |
| 2017/0035539 A1 | 2/2017 | Bringley | |
| 2019/0336259 A1* | 11/2019 | Elmore | C08J 3/248 |
| 2021/0389175 A1 | 12/2021 | Leblanc | |

FOREIGN PATENT DOCUMENTS

| | | |
|---|---|---|
| JP | 2002-296115 A | 10/2002 |
| JP | 2011-220770 A | 11/2011 |
| JP | 2015-530573 A | 10/2015 |
| WO | WO-2014/036660 A1 | 3/2014 |
| WO | WO-2016/075639 A1 | 5/2016 |
| WO | WO-2016075639 A1 * 5/2016 | A61B 17/58 |

OTHER PUBLICATIONS

International Search Report and Written Opinion for International Application No. PCT/CA2018/051028, dated Dec. 21, 2018 (33 pages).

* cited by examiner

SYSTEM AND DEVICES FOR MEASURING LIGHT SOURCES AND METHODS OF USE THEREOF

BACKGROUND OF THE INVENTION

Dental restorations often involve a light-curable resin that is hardened to a cure strength by exposure to light in the visible and/or ultraviolet (UV) spectrum. While dental resin restorations represent a significant market, over 60% of all restorative dentistry is for the replacement of existing restorations. Placement of resin restorations is technique-sensitive, and such restorations must be placed properly to deliver the best health care to patients. The most common cause of failure of resin restorations is secondary caries (tooth decay) due to micro-leakage around the restoration, followed by restoration fracture, and marginal defects. These failures may be due to the fact that the resin restoration was inadequately polymerized and did not reach its intended physical properties.

Inadequately cured resins may result in reduced physical properties of the restoration, reduced bond strengths, increased wear and breakdown at the margins of the restoration, decreased biocompatibility, and increased DNA damage from leachates, such as bisphenol A diglycidylether methacrylate (Bis-OMA), tetraethyleneglycol dimethacrylate (TEGDMA), 1,6-bis(methacryloxy-2-ethoxycarbonylamino)-2,4,4-trimethylhexane (UDM), and 2,2-bis(4-(2-Methacryloxyethoxy)phenylpropane (bis-EMA). Conversely, too much curing energy delivered to the restoration may cause an unnecessary and unacceptable temperature increase in the tooth and surrounding oral tissues.

Typical instruments for measuring the output power of light sources are not portable and/or have high operating costs. There is a need in the art to develop a portable system that can quickly collect and measure light from an external source and relay the information in real time, e.g., to enable a clinician to make adjustments to curing times.

SUMMARY OF THE INVENTION

We have developed a system and related equipment for the precise measurement of an output characteristic, e.g., the output power, of a light source, e.g., a dental light curing unit (LCU) or light for photodynamic therapy, using a light collector, a light detector, and a computer programmed to deliver an output characteristic, e.g., the output power, of the light source to the user. The system allows, for example, for the determination of a proper exposure time or the selection of a light source as needed for a specific application.

In one aspect, the invention features a system for the determination of an output characteristic, e.g., the output power, of a light source, the system having a light collector; a non-spectral light detector configured to produce a signal from light collected by the light collector; and a computer programmed to provide an output characteristic, e.g., the output power, of the light source from the signal produced by the light detector. In one embodiment, the computer is programmed with a neural network. In certain embodiments, the neural network is trained with the spectral profiles of a plurality of light sources including the light source. In further embodiments, the neural network is trained with a plurality of input values for an optical characteristic, e.g., the responsivity curve, of the light detector. In some embodiments, the input data for the neural network is a function of the optical characteristic, e.g., responsivity curve, of the light detector. In some embodiments, the input data for the neural network is normalized to values between 0-1. In further embodiments, the system has a mobile device that communicates with the computer to provide, e.g., display, the output characteristic, e.g., the output power, of the light source. In one embodiment, the mobile device is a handheld device. In one embodiment, the light detector is a photodiode, a photomultiplier tube, a CCD array, a CMOS sensor, or a photovoltaic device. In some embodiments, the computer communicates wirelessly to the light detector.

Another aspect of the invention features a computer programmed with a neural network whose input data is a function of a signal produced by a light detector to determine an output characteristic, e.g., the output power, of a light source. The neural network has a plurality of input nodes. Each input node is configured to contain at least one data point; a plurality of hidden nodes grouped in a plurality of layers, wherein each of the plurality of hidden nodes receives as input all of the at least one data points from the plurality of input nodes; and an output node, wherein the plurality of hidden nodes and output node are trained with the spectral profiles of a plurality of light sources including the light source being measured. In some embodiments, the hidden nodes and output node are further trained with an optical characteristic, e.g., the responsivity curve, of the light detector. In some embodiments, the data on each of the plurality of hidden nodes is summed before being passed to the plurality of hidden nodes in the next layer. In some embodiments, the data passed between hidden nodes is statistically weighted using the spectral profiles of a plurality of light sources including the light source and the optical characteristic, e.g., responsivity curve, of the light detector. In further embodiments, the plurality of hidden nodes contains a transfer function to update the statistical weights of each of the plurality of hidden nodes. In some embodiments, the derivative of the transfer function is used to update the statistical weights of each of the plurality of hidden nodes. In one embodiment, the transfer function is a sigmoidal. In other embodiments, the transfer function is a rectified function or a combination of sigmoidal and rectified, e.g., in different layers. In some embodiments, the data from the plurality of hidden nodes in the last of the plurality of layers are passed to the output node. In further embodiments, the output node contains a sigmoid transfer function. In some embodiments, wherein the output node returns a value representative of an output characteristic, e.g., the output power, of the light source.

In another aspect, the invention features a system for the determination of an output characteristic, e.g., the output power, of a light source, the system having a light collector; a light detector configured to produce a signal from light collected by the light collector; and a computer programmed with a neural network to provide an output characteristic, e.g., the output power, of the light source from input data corresponding to the signal produced by the light detector. In certain embodiments, the neural network is trained with the spectral profiles of a plurality of light sources including the light source. In further embodiments, the neural network is trained with a plurality of input values for an optical characteristic, e.g., the responsivity curve, of the light detector. In some embodiments, the input data for the neural network is a function of the optical characteristic, e.g., responsivity curve, of the light detector. In some embodiments, the input data for the neural network is normalized to values between 0-1. In further embodiments, the system has a mobile device that communicates with the computer to provide, e.g., display, an output characteristic, e.g., the output power, of the light source. In one embodiment, the mobile device is a handheld device. In some embodiments, the computer communicates wirelessly to the light detector.

In a related aspect, the invention provides a method of determining an output characteristic, e.g., the output power, of a light source by collecting light from a light source with a light collector and light detector to produce a signal; sending the signal to a computer programmed with a neural network, as described herein, to determine an output characteristic, e.g., the output power, of the light source; and providing, e.g., displaying, an output characteristic, e.g., the output power, to the user. In some embodiments, the computer communicates wirelessly to the light detector. In some embodiments, the computer communicates wirelessly with a mobile device. In one embodiment, the mobile device is a handheld device.

In another related aspect, the invention provides a method of determining an output characteristic, e.g., the output power, of a light source by collecting light from a light source with a light collector and non-spectral light detector to produce a signal; sending the signal to a computer programmed with a neural network to determine an output characteristic, e.g., the output power, of the light source; and providing, e.g., displaying, an output characteristic, e.g., the output power, to the user. In one embodiment, the signal produced from the non-spectral light detector is a voltage. In some embodiments, the computer communicates wirelessly to the non-spectral light detector. In some embodiments, the computer communicates wirelessly with the mobile device. In one embodiment, the mobile device is a handheld device.

In another aspect, the invention provides a method of determining an output characteristic of a light source by receiving a signal from light collected from a light source with a light collector and non-spectral light detector; and using the signal in a computer programmed to determine the output characteristic of the light source. In a related aspect, the invention provides a method of determining an output characteristic of a light source by receiving a signal from light collected from a light source with a light collector and light detector; and using the signal in a computer programmed with a neural network, as described herein, to determine the output characteristic of the light source. These methods may further include providing the output characteristic to a user.

In a further aspect, the invention provides a non-transitory computer memory programmed to carry out the determination of an output characteristic of a light source as described herein.

In any aspect of the invention, the output characteristic may be output power, output energy, output flux, a calculated spectrum, irradiance, calculated light source age, or calculated exposure time.

The invention further provides a device including a light diffusing element including a top portion having a screen allowing the passage of light; a bottom portion having an inner surface that is substantially hemispherical, and a side portion having an inner surface that is substantially cylindrical and an outlet port. The side portion is connected to the top portion and the bottom, and the outlet port is separated from the inner surface by a diffusive material, which may or may not be the same material as that of the inner surface.

The device may further include a filter above or below the screen. In certain embodiments, the device further includes a light detector, e.g., a non-spectral light detector, configured to produce a signal from the light in the outlet port. In other embodiments, the light diffusing element prevents light from penetrating through the side portion or the bottom portion except via the outlet port. The light diffusing element may allow for substantially uniform light diffusion across the inner surfaces. The inner surfaces and/or screen include, for example, polytetrafluoroethylene, barium sulfate, or polyoxymethylene. The screen may also include a transparent or translucent material and/or be coated with a translucent Lambertian coating.

In certain embodiments, the height of the substantially cylindrical inner surface of the side portion is between 1 mm and 50 mm, e.g., between 1 mm and 15 mm. In other embodiments, the top further includes an aperture. The aperture in the top portion of the light diffusing element may have a diameter between 1 mm and 300 mm, e.g., between 4 mm and 30 mm. In yet other embodiments, the outlet port has a diameter between 1 and 20 mm, e.g., between 5 and 15 mm. In further embodiments, the diameter of the substantially cylindrical inner surface of the side portion and/or the substantially hemispherical inner surface of the bottom portion is between 1 and 30 mm., e.g., between 15 and 25 mm.

This device may be used in any system or method of the invention.

BRIEF DESCRIPTION OF THE DRAWINGS

FIG. 6A-6B: Comparison of the output power of the Bluephase 20i dental light curing unit as measured with the photodiode-based neural network system and a conventional spectrometer.

DETAILED DESCRIPTION OF THE INVENTION

The present invention provides a system for determining an output characteristic, e.g., output power, of a light source, e.g., a LCU used in dental restorations or a light used in photodynamic therapy. The devices, systems, and methods may be generally employed with any light source, including incandescent, laser, LED, halogen, fluorescent, plasma arc, or solar. Information from the invention can be used to calculate exactly how much light is needed for a given process or procedure, e.g., to cure a photosensitive resin material without overexposure. An advantage of the system is that it allows the end user to determine an output characteristic, e.g., power, without obtaining spectral data.

Figure 1:
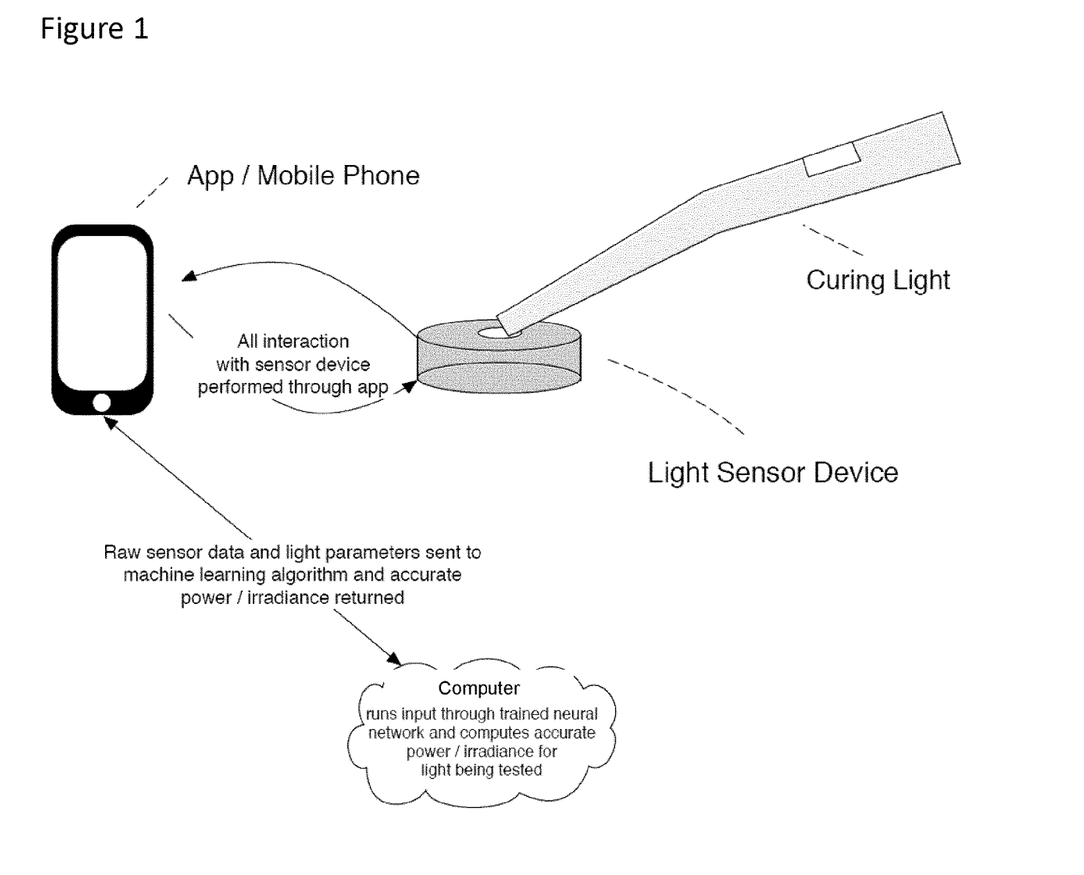
FIG. 1: Scheme describing how a system of the invention may be used to measure an output characteristic, e.g., the output power, of a dental light curing unit (LCU) and provide, e.g., display, the result to the user.

The system includes a light collector for the light emitted from the light source, a light detector configured to produce a signal from the light collected by the light collector, and a computer programmed to provide the output characteristic, e.g., power, of the light source from the signal produced by the light detector. In particular, the system does not require the use of a spectral detector to produce an output characteristic, e.g., the output power, of a light source, i.e., the light detector is not required to measure intensity as function of wavelength. Typically, the light source will produce light in the range of the IR to UV, e.g., between 100 and 2500 nm, e.g., between 190 and 1100 nm. The light detected may be a subset of the spectrum produced by the light source. For example, various filters may be employed on the light source, the light collector, or separately to control the spectrum detected. In certain embodiments, the light detected is in the visible range, e.g., between 360 and 540 nm. An advantage of the system is that the light collector may communicate remotely, e.g., wirelessly, with the computer, allowing the measurement of an output characteristic, e.g., the output power, to be performed in most locations. This feature is advantageous as the light source may not be portable or easily moved to the location of the computer. A scheme describing how a system of the invention may be used to measure an output characteristic, e.g., the output power, of a light source, e.g., a dental light curing unit (LCU), and provide, e.g., display, the result to the user is shown in FIG. 1.

The system may be implemented in one or more parts. For example, each of the light collector, light detector, and computer may be a separate component, or two or more of the components may be physically connected. When separate components are employed, the computer, or a part of it, may be in a physically different location than the light collector and/or light detector. Furthermore, the light detector may interface with or be a part of a mobile device, e.g., cellular telephone or other handheld device, that can communicate with the computer, e.g., wirelessly. Functions of the computer may also be distributed over several processors or cores, which may or may not be physically linked.

Light Collectors

Figure 2A:
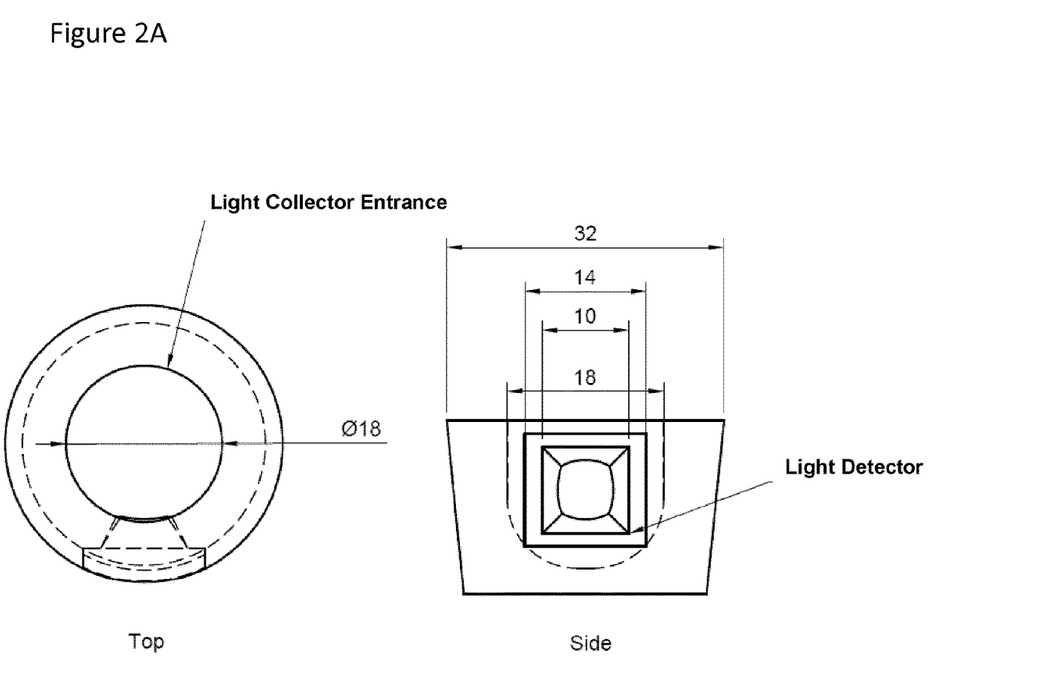
FIGS. 2A-2B: Technical drawings of light collectors showing the locations of the entrance to the collector and light detector. Dimensions are in mm.
Figure 2B:
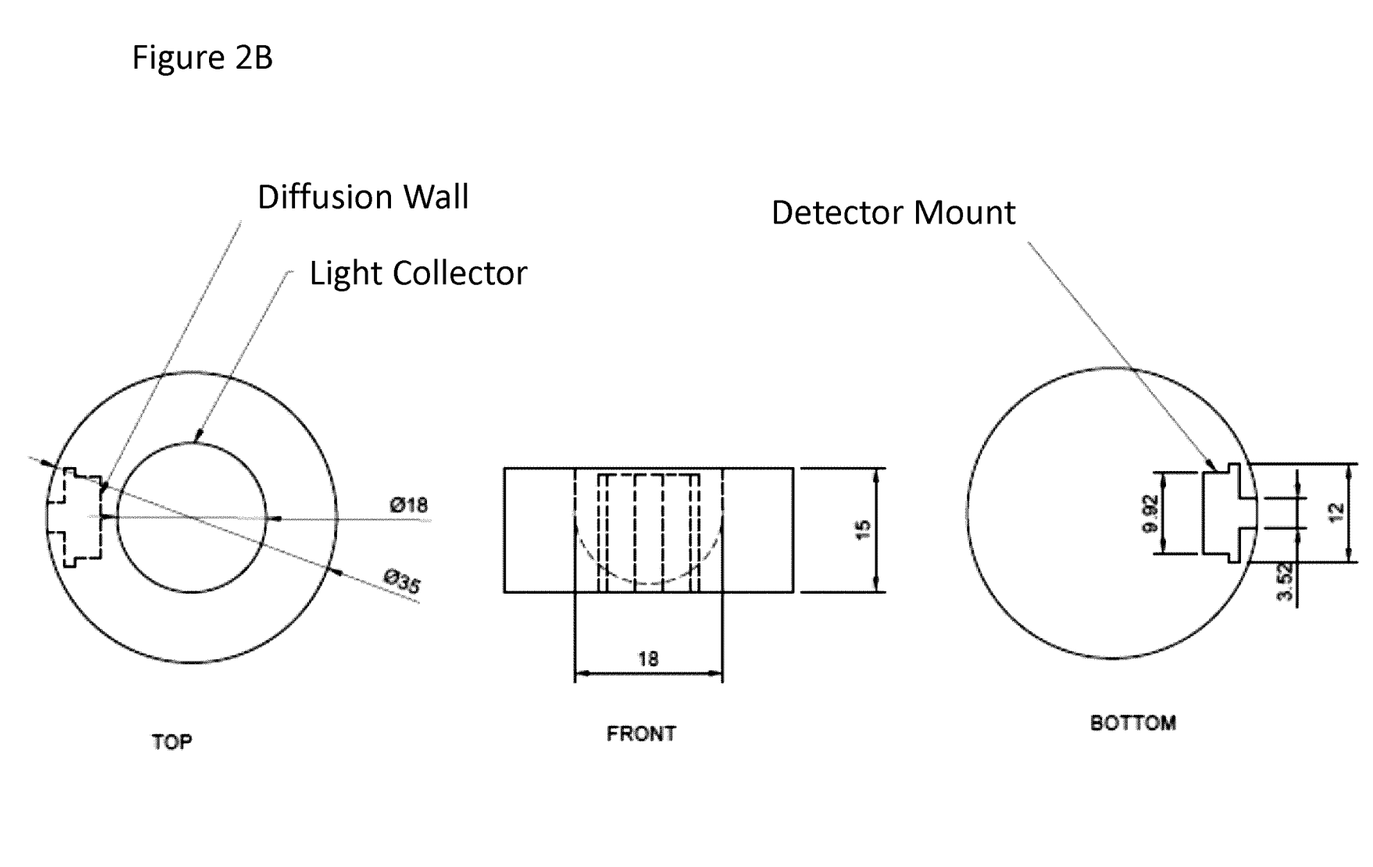

Any suitable light collector may be employed in the system of the invention. A preferred light collector is one that allows for the collection of light that is not dependent on the angle that light enters the collector, e.g., as described in WO 2014/036660, herein incorporated by reference. Schematics of light collectors useful for a system of the invention are shown in FIGS. 2A-2B.

An exemplary light collector to be used as part of the system of the invention contains a light diffusing element that includes top portion that includes a screen and an optional aperture, a bottom portion that includes an inner surface that is substantially hemispherical, and a side portion that includes an inner surface that is substantially cylindrical. The side portion further includes an outlet port. The light diffusing element may or may not be enclosed within an external shell. The side, bottom, and top portions may be manufactured from any suitable material, e.g., polytetrafluoroethylene (e.g., Teflon® or Spectralon® from Labsphere Inc.), polyoxymethylene (e.g., Delrin®), barium sulfate (e.g., 6080 White Reflectance Coating from Labsphere Inc.) or other Lambertian coating (e.g., Spectraflect® or Duraflect® from Labsphere Inc.). These portions may also include other materials, e.g., plastic, ceramic, glass, or metal, on which Lambertian materials are layered or coated. When the top portion includes an aperture, the portions of the top not including the screen may be made from any material suitable to hold the screen, e.g., plastic, ceramic, glass, or metal. The surface of a screen, e.g., the material of the surface or a coating applied to the surface, is white, translucent, and Lambertian, e.g., made from or coated with polytetrafluoroethylene (e.g., Teflon® or Spectralon® from Labsphere Inc.), polyoxymethylene (e.g., Delrin®), barium sulfate (e.g., 6080 White Reflectance Coating from Labsphere Inc.) or other Lambertian coating (e.g., Spectraflect® or Duraflect® from Labsphere Inc.). The screen is located above the side and bottom portions of light diffusing element of the light collector. When the top includes an aperture, the screen may be sized to cover at least the aperture of light diffusing element. The length of the screen may be equal to or greater than the diameter of the substantially hemispherical bottom portion. In some embodiments, the device may include a filter, e.g., glass (such as alkali-aluminosilicate sheet toughened glass (Gorilla® glass)), neutral density filter, blue band filter, or a filter that filters wavelengths of at least 500 nm. The filter may be located in the top portion of light diffusing element above or below the screen. In certain embodiments, the filter acts as a physical barrier to protect the screen from damage. When an aperture is present in the top portion, it may include one or more tiered recesses into which the screen and any filter rest. The tiered recesses provide physical support for the perimeter of the screen and filter. Alternative ways of attaching a screen and/or filter are known in the art. For example, the screen may be part of a component that screws or clamps to the side and bottom portions. The screen may also be a sheet of material that is compressed against the side portion, e.g., by the external housing. The exterior shape of optional external shell may be substantially cubical, cylindrical, pyramidal, or a rectangular solid. The internal surface and cavity shape of external shell may vary according to the external shape of the light diffusing element, e.g., it may conform to the exterior shape. In certain embodiments, as shown in FIG. 2A, the outlet port includes an opening from the inner surface of the side portion. In other embodiments, as shown in FIG. 2B, the outlet port is separated from the inner surface by a diffusive material. The diffusive material may be the material of the inner surface or a different material, e.g., placed in an opening in the inner surface. It will be apparent that the diffusive material allows the passage of light from the inner surface to the outlet port.

Once light has been collected by the light collector, the light is transferred from the exit aperture of the light collector to a light detector, e.g., by a light conducting conduit. The light conducting conduit may be any suitable light conducting medium, such as a fiber optic cable or a liquid light guide. Other light conducting conduits are known in the art. Alternatively, the light detector may be incorporated into the light collection device itself.

Light Detectors

Figure 3:
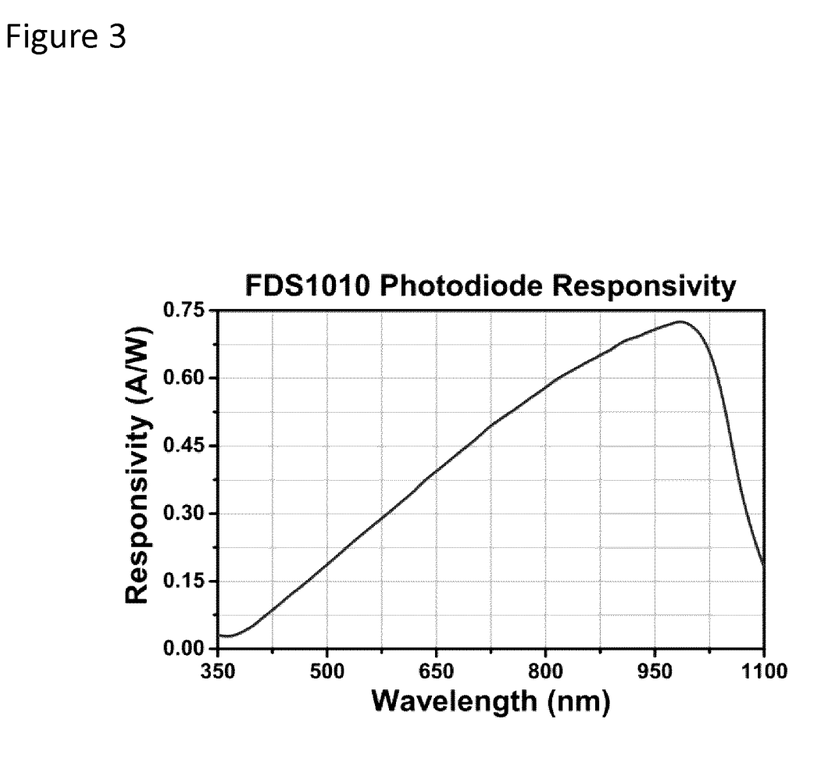
FIG. 3: Responsivity curve of the FDS1010 photodiode configured to act as a light detector in a system of the invention.

A light detector for use in the system of the invention may be any device capable of measuring the intensity of light and encoding the information in an electronic signal, e.g., a photodiode, a photomultiplier tube, a CCD array, a CMOS sensor, thermopile, or a photovoltaic device. In certain embodiments, the detector is non-spectral, i.e., the detector measures the integrated intensity at all wavelengths of light. An exemplary low cost light detector for use in the invention is a photodiode, as it produces a single value for the current (and thus the voltage) resulting from a light source irradiating its active area. Non-spectral light detectors may respond differently to light at different wavelengths, according to an optical characteristic of the source, e.g., a responsivity curve (FIG. 3). The optical characteristic, e.g., responsivity curve, can be used to compensate for this non-uniformity of a light source in the system of the invention. In certain embodiments, spectral light detectors may also be employed, e.g., with a light collector having an outlet port separated from the inner surface by a diffusive material.

Computer

The data produced by the light collector and light detector may be sent to a computer for processing and provision of the processed data to the user, e.g., by displaying the output characteristic. The computer may receive the data from the light detector by way of a physical connection, such as a USB cable or similar hardware connection. Alternatively or additionally, the data from the light detector may be sent to the computer via a wireless connection, such as optical, RF, or other wireless connection, e.g., Bluetooth®, may be employed.

The computer system is programmed to process the data and provide the output characteristic, e.g., power, of the light source to the user. Programming may be via software, hardware, or a combination thereof. The data from the light detector may be processed by a single program. Additionally or alternatively, multiple computer programs may be used in processing the data, and multiple computers may be employed in the processing or provision of the data.

In order for the computer program to be able to provide the output characteristic, e.g., power, of the light source, it may be programmed to recognize a number of variables about the system. The computer may be programmed with both the spectra of the plurality of light sources it will be used to measure and with an optical characteristic, e.g., the responsivity curve, of the light detector, e.g. a photodiode. We have found that the spectrum of a light source will be substantially constant independent of the output intensity of the light source due to the use of identical components, e.g., LEDs, in its manufacture. Thus, a light source that has a severely degraded intensity output will still have a nearly identical spectrum as a brand new light source of the same make. This information is programmed into the computer program for the plurality of light sources that will be measured by and have data processed by the program; therefore, the choice of light source is a user-selectable option before making a measurement. The responsivity curve of a non-spectral light detector relates to the amount of photocurrent produced at every wavelength of light that impinges the detector's active area; the light detector produces a single value for the current corresponding to the integrated response of the light detector at all wavelengths in its range. The computer may be programmed with an optical characteristic, e.g., responsivity curve, of the specific light detector used in the system and also may be user-selectable.

Neural Network

The computer may include a neural network for processing the signal from the light detector. Neural networks are patterned mathematically to acquire, process, and interpret incoming information in a similar way to the human brain, e.g., by taking input information and passing it along to at least one "neuron", further propagating information until terminating at an output. By passing information along to multiple "neurons" the neural network is able to improve the way in which it interprets an input signal, i.e., it learns from previous input signals, thereby improving the accuracy of the end result. The "neurons" are typically organized in layers. Different layers may perform different kinds of transformations on their inputs. Signals travel from the first (input), to the last (output) layer, possibly after traversing the layers multiple times, with each layer performing a mathematical manipulation on the data.

In order for a program such as a neural network to be able to learn from input data and output an appropriate solution to a problem, it first is trained with a set of conditions which represents a correct value or series of values for a problem to be iteratively solved. The training data provides a probabilistic value for the "correct" value of a given problem at each input value. For a neural network of use in the current invention, the training set data may be a combination of the spectra of the plurality of light sources to be measured by the light detector as well as an optical characteristic of the light detector, e.g., the responsivity curve, e.g., power per unit current (W/A) as a function of wavelength. This information may be used to provide probabilistic conditions, e.g. values from 0 to 1, for what the "ideal" power of a light source should be at every wavelength capable of being converted into photocurrent on the light detector.

Figure 4:
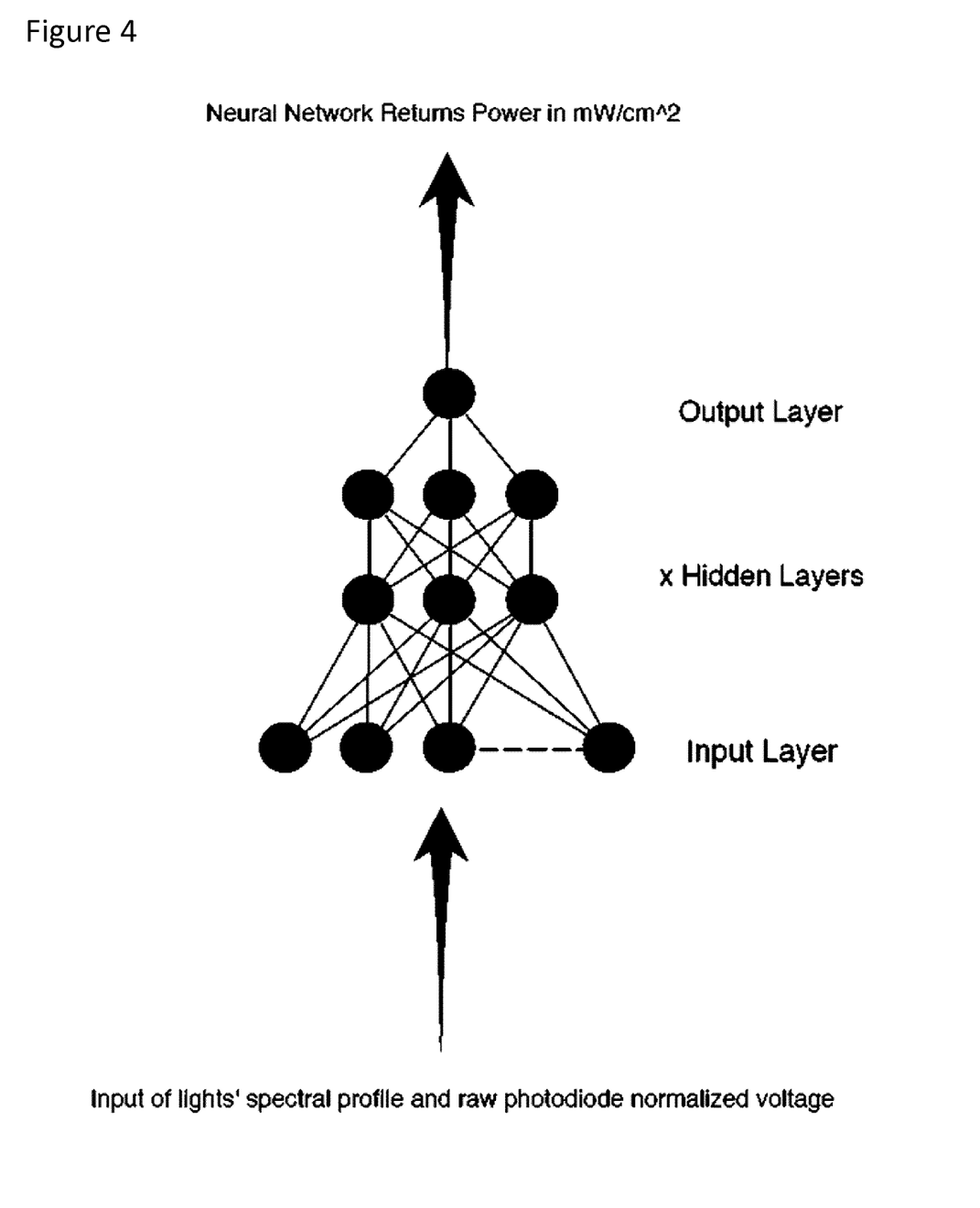
FIG. 4: Diagram of a back-propagation neural network used to measure an output characteristic, e.g., the output power, of a light source using the voltage from a photodiode as input. The circles are nodes, and the lines between nodes are the information being passed from the nodes.

A neural network of a system of the invention may be arranged into three components: the input layer, the hidden layer or layers, and the output layer; this design is known as a back-propagation architecture and a structural diagram of this architecture is showing in FIG. 4. Each of the layers is divided into sub-units called nodes. Within the input, each of the nodes corresponds to a single datum point derived from the output signal of the light detector, e.g., photodiode. The single datum point in each input node is then duplicated and placed into every node in the first of the hidden layers.

The neural network contains at least one hidden layer and may contain others. The number of hidden layers is often linearly correlated with the accuracy and learning ability of the neural network—as the number of hidden layers increases, so too does the accuracy of the resulting output variable, i.e., the output characteristic, e.g., output power of a light source. Each layer consists of a number of individual nodes for receiving data from the previous layer, be it the input layer or another hidden layer within in the neural network. The nodes of the hidden layers contain the probabilistic conditions, e.g., values from 0 to 1, for what the "ideal" power of a light source should be at every wavelength capable of being converted into photocurrent on the light detector. Each node within the hidden layer receives every data point from the previous layer, i.e. the data point from a single node is copied and placed into every node in the next layer of the neural network.

In the hidden layers of the neural network of the invention, the signal from the light detector, e.g., voltage from the photodiode, is multiplied by the wavelength values over the range of the wavelengths from the spectrum from a chosen light source and normalized to produce a series of input values between 0 and 1. These values are then summed together to produce a single value used as input for the transfer function of the neural network, which is a linear or non-linear function used to simulate the learning ability of biological neurons. For neural networks of the invention, this function may be non-linear, e.g., a sigmoidal function, as it has an easily computable derivative. The first derivative is used to calculate the error of the neutral network for improving the learning ability by updating the statistical weights. Alternatively, the transfer function may be rectified.

The single value of the summed inputs is directed to the transfer function, e.g., sigmoidal or rectified, returning a single value. This results in a single value for each node in the hidden layer, and each of these datum points is copied and sent as input to every node in the next hidden layer, with every node receiving as input all data from the previous layers' nodes. The process of summing, passing through the transfer function, e.g., sigmoidal or rectified, and passing to the next layer's nodes is repeated for each of the hidden layers of the neural network. Different transfer functions may be used in different layers. For example, the transfer function for one layer may be sigmoidal and may be rectified for another.

The final step in using a neural network of the invention is to pass the data from the final hidden node into the output layer, which includes a final round of summing the data from the nodes of the final hidden layer and passing it through the transfer function, e.g., sigmoidal or rectified, to produce a single output. This output, when un-normalized, returns the power of the light source.

Data Provision

Once the data has been processed by the computer, e.g., programmed with a neural network, the data is provided to the user. The data can be provided by a wired device, such as a computer monitor, or can be a wireless device, e.g., a mobile device such as a cellular telephone or a tablet. Data may be provided by any suitable means, e.g., visually in a display or audibly from a speaker. Such methods may provide numerical or other data, e.g., a color to signify a certain range of a numerical value. The nature of the provision of data may depend on the output characteristic. For example, data on power, energy, irradiance, or cure time may be provided numerically. Cure time may also be provided in the form of a countdown, which is either numerical or symbolic (e.g., an alarm or other indicator triggers after the cure time has elapsed). Data may also be provided directly to the light source, e.g., to control the length of exposure of the light source.

The output characteristic may be any measure that can be determined from the input data. Examples of output characteristics include output power, output energy, output flux, a calculated spectrum, irradiance, light source age, and calculated exposure time (e.g., time to cure a resin). The output characteristic provided to the user may also be determined in steps. For example, the neural network may provide one output characteristic, e.g., power, which is used by the same or a different computer to determiner another characteristic, e.g., irradiance or cure time, according to known methods.

Methods of Use

The invention features methods to determine an output characteristic, e.g., the output power, of a light source, e.g., using a computer programmed with a neural network. Typically, the light from the light source is directed into a light collector such that the light is diffused by the light collector's inner surfaces and directed to a light detector. This diffused light impinges on the active area of a light detector, producing a signal representative of an output characteristic, e.g., the output power, of the light source. In some embodiments, the light detector is a non-spectral light detector, e.g., a photodiode. This signal is then sent to the computer to provide an output characteristic, e.g., the output power, of the light source. Once the computer has processed the signal from the light detector, the resulting output characteristic, e.g., output power, of the light source is provided, e.g., displayed, to the user, e.g., on or via a mobile device in substantially real-time. In some embodiments, the computer communicates with the light detector wirelessly, e.g., RF, optical, or other communication standard. Further, the computer may be in wireless communication with the device providing, e.g., displaying, the data. In certain embodiments, the device is a handheld device, e.g., a cellular telephone or a tablet.

The accuracy of the determination of an output characteristic, e.g., the output power, from a light source will depend on the number of individual measurements of an output characteristic, e.g., the output power, of the light source made during a measurement. This is determined by the length of time the active area of the light source is exposed to the light form the light source as well as the sampling frequency of the measurement, e.g., how many data points are collected per unit time. Typical sampling times for measuring an output characteristic, e.g., the output power, of a light source are from about 1 second to about 1000 seconds, e.g., from about 1 second to about 100 seconds, from about 50 seconds to about 200 seconds, from about 150 seconds to about 300 seconds, from about 250 seconds to about 400 seconds, from about 350 seconds to about 500 seconds, from about 450 seconds to about 600 seconds, from about 550 seconds to about 700 seconds, from about 650 seconds to about 800 seconds, from about 750 seconds to about 900 seconds, or about 850 seconds to about 1000 seconds, e.g., about 1 second, about 2 seconds, about 3 seconds, about 4 seconds, about 5 seconds, about 6 seconds, about 7 seconds, about 8 seconds, about 9 seconds, about 10 seconds, about 50 seconds, about 100 seconds, about 150 seconds, about 200 seconds, about 250 seconds, about 300 seconds, about 350 seconds, about 400 seconds, about 450 seconds, about 500 seconds, about 550 seconds, about 600 seconds, about 650 seconds, about 700 seconds, about 750 seconds, about 800 seconds, about 850 seconds, about 900 seconds, about 950 seconds, or about 1000 seconds.

For a method of the invention, the sampling frequency of the light detector varies between about 1 Hertz (Hz) to about 1000 Hz, e.g., from about 1 Hz to about 100 Hz, from about 50 Hz to about 200 Hz, from about 150 Hz to about 300 Hz, from about 250 Hz to about 400 Hz, from about 350 Hz to about 500 Hz, from about 450 Hz to about 600 Hz, from about 550 Hz to about 700 Hz, from about 650 Hz to about 800 Hz, from about 750 Hz to about 900 Hz, or about 850 Hz to about 1000 Hz, e.g., about 1 Hz, about 2 Hz, about 3 Hz, about 4 Hz, about 5 Hz, about 6 Hz, about 7 Hz, about 8 Hz, about 9 Hz, about 10 Hz, about 50 Hz, about 100 Hz, about 150 Hz, about 200 Hz, about 250 Hz, about 300 Hz, about 350 Hz, about 400 Hz, about 450 Hz, about 500 Hz, about 550 Hz, about 600 Hz, about 650 Hz, about 700 Hz, about 750 Hz, about 800 Hz, about 850 Hz, about 900 Hz, about 950 Hz, or about 1000 Hz.

EXAMPLES

Figure 5:
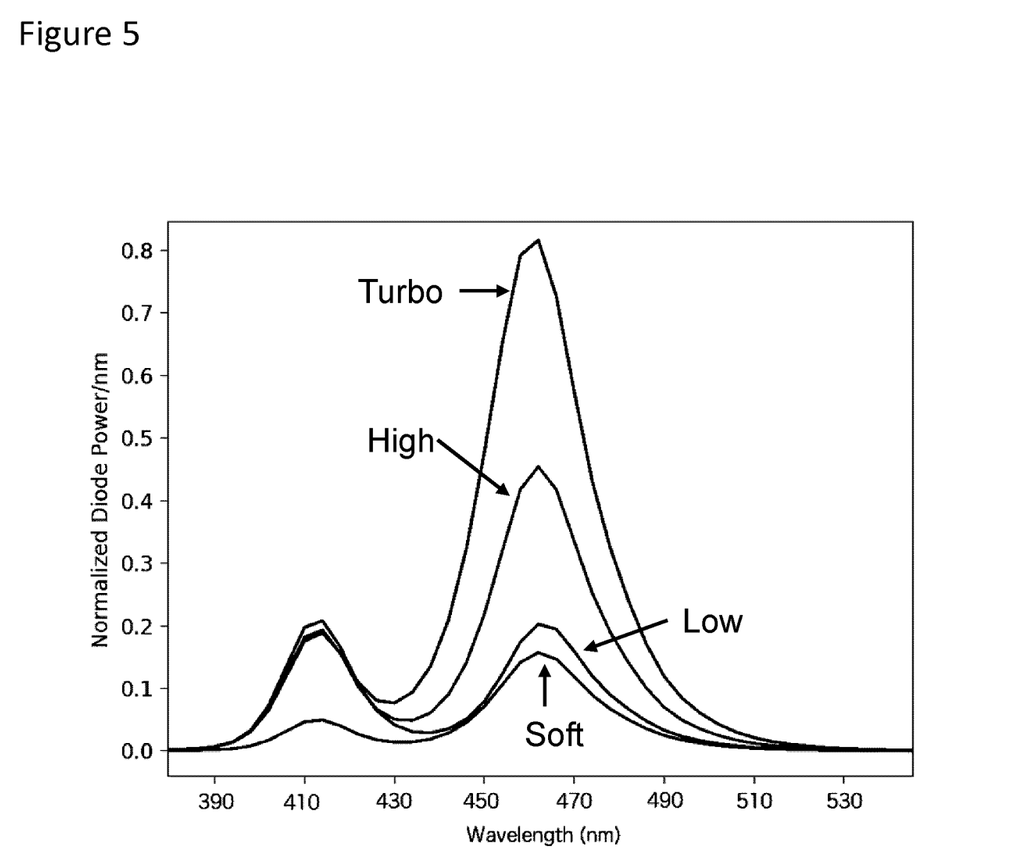
FIG. 5: Spectral profile of the Bluephase 20i dental light curing unit showing the power output in each of the four operating modes, soft mode, low mode, high mode, and turbo mode.

In this example, the system of the invention including a light collector, photodiode, and computer programmed with a neural network was used to measure the power of the Bluephase 20i dental light curing unit (LCU). The Bluephase 20i has four operating modes, each with a different output power of the main light source; in order from lowest power to highest power, the four modes are soft, low, high, and turbo. The spectrum of the Bluephase 20i LCU is shown in FIG. 5. This type of information, in addition to the photodiode responsivity curve shown in FIG. 3, was used as training data to provide probabilistic bounds for the neural network.

When the neural network was fully trained, it takes 1024 input values matching the resolution of the wavelength values produced by the spectrometer. The resulting value is multiplied by the output intensity of the photodiode and subsequently normalized to a value between 0-1. For each input, a single value is produced. When these values are denormalized, the result is the power (in mW) of the light source.

Figure 6A:
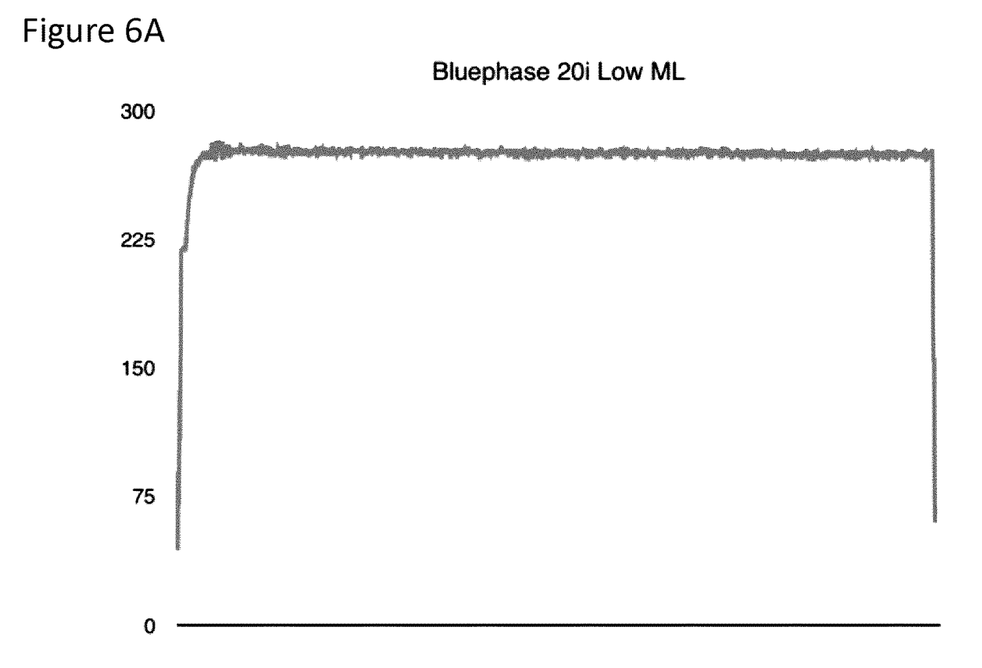
FIG. 6A is a graph of power data measured with a photodiode-based neural network system.
Figure 6B:
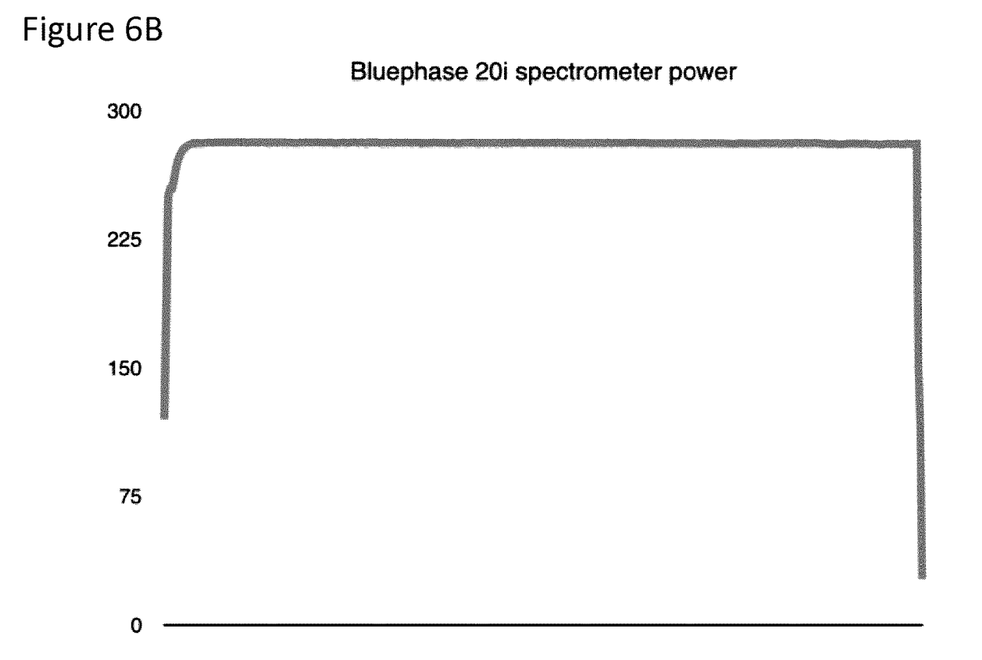
FIG. 6B is a graph of power data measured with a spectrometer.

A sampling frequency of 100 readings/second, i.e., 100 Hz, and a cure time of 10 seconds results in an input matrix of [1000, 1024] data points that was input into the neural network, resulting in an output matrix of [1000, 1]. The results of such output are shown in FIGS. 6A and 6B compared to the same type of measurement using a conventional spectrometer. Using the neural network, the resulting output power measurements come within 5% of the spectrometer.

Figure 7:
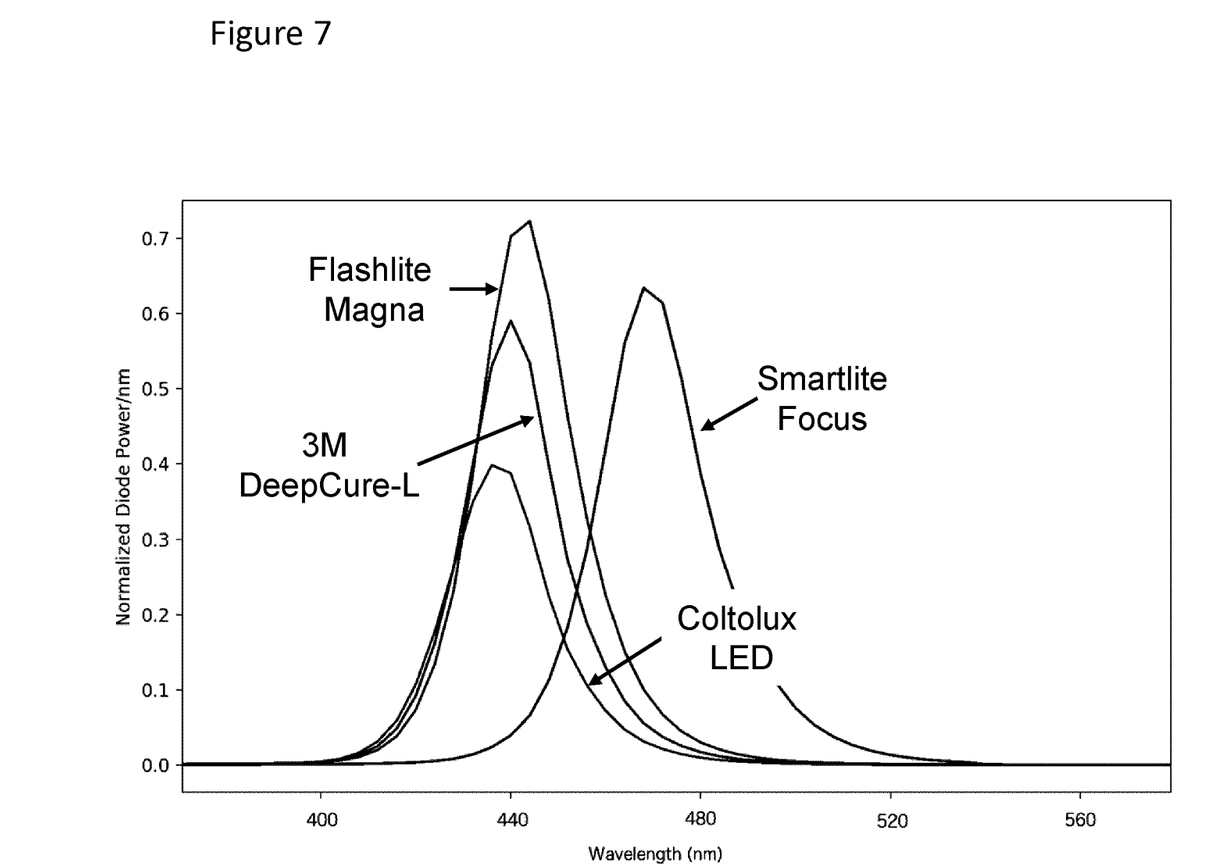
FIG. 7: Spectral profiles of four different dental curing lights as measured with a system of the invention. The lights were 3M DeepCure-L, Coltolux LED, Flashlite Magna, and Smartlite Focus.
Figure 8:
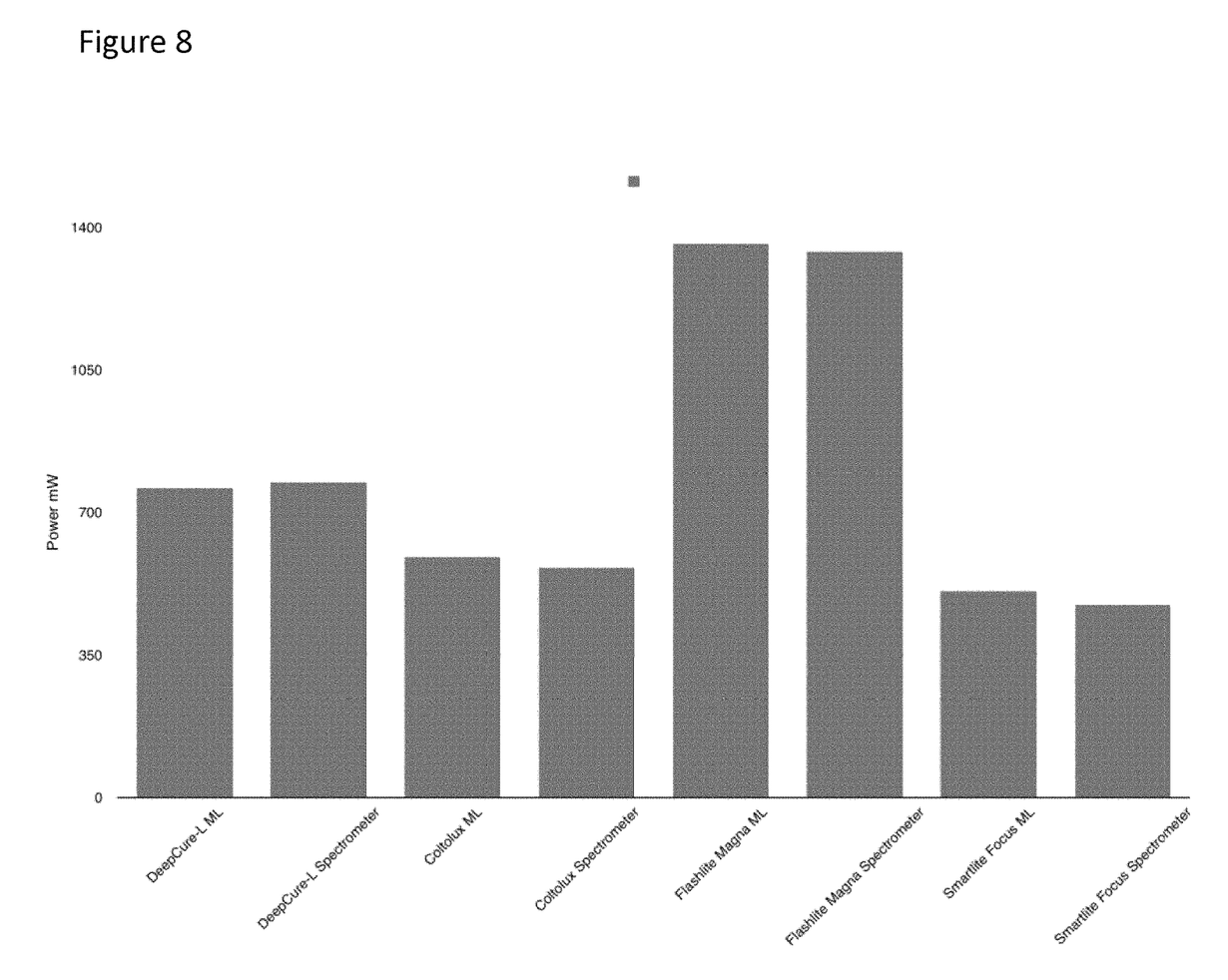
FIG. 8: Comparison of the measured output power for four different curing lights (3M DeepCure-L, Coltolux LED, Flashlite Magna, and Smartlite Focus) using both a system of the invention and a conventional spectrometer.

The spectral profiles of four different curing lights (3M DeepCure-L, Coltolux LED, Flashlite Magna, and Smartlite Focus) were also input into the neural network as training data (FIG. 7). Using the same methodology as used to measure the output power for the Bluephase 20i curing light, the average output power of each of the four curing lights was measured using the photodiode-based neural network system and a conventional spectrometer. The results are shown in FIG. 8, and as before, the average power produced by the photodiode-based neural network system and the spectrometer are again within 5% of each other.

Figure 9:
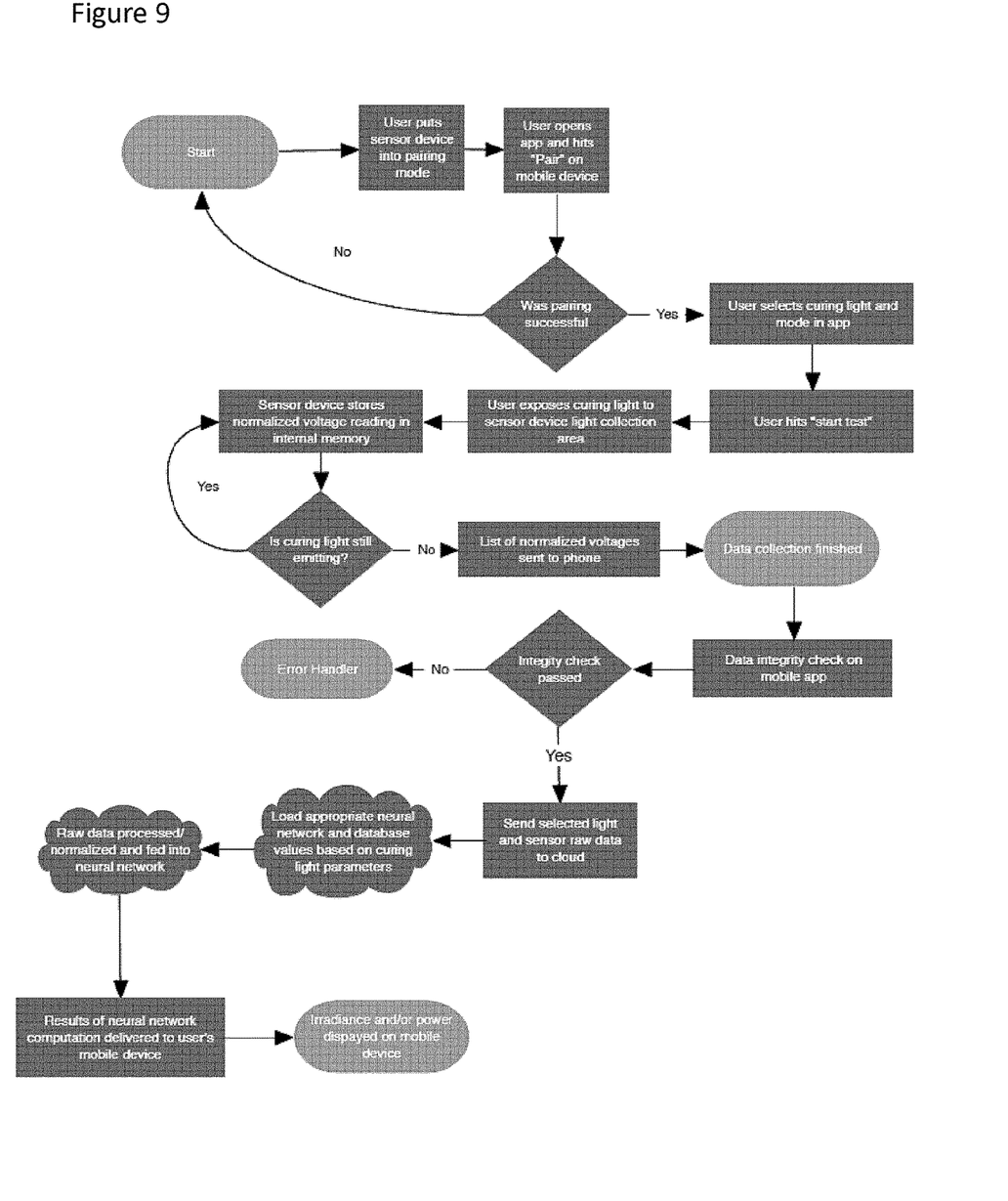
FIG. 9: Flow diagram of how a user would use a system of the invention for measuring an output characteristic, e.g., the output power, of a light source.

The system may be used to measure the power from any light source. An exemplary application for a system of the invention with a light collector, light detector, a computer programmed with a neural network, and a mobile device is for measuring the output power of curing lights used in restoring dental work. FIG. 9 is a flow diagram of how a user, e.g., dentist or dental assistant, would use the system to measure the output power of a curing light. First, the mobile device and the sensor are paired together over a wireless communications protocol, e.g., Bluetooth® or other wireless transmission protocol. Once paired, the user can use the mobile device to control all aspects of the measurement. The user can hit "Start" on the mobile device program and then expose the curing light to the light collector for an appropriated length of time. After the data are collected, the integrity of the data is verified, and then the raw data, e.g., normalized voltages from the light detector, are sent wirelessly to a computer programmed with a neural network configured to calculate the output power of the light source. The data sent to the neural network includes the specific light source and light detector used to acquire the data, so the neural network uses the correct spectral profile and responsivity curve for its determination. When the determination is complete, the resulting output power of the light source is displayed on the mobile device.

What is claimed is:

1. A system for the determination of an output characteristic of a light source, the system comprising:
   a) a light collector;
   b) a light detector configured to produce a signal from the light collector; and
   c) a computer programmed to provide the output characteristic of the light source from the signal produced by the light detector,
   wherein the light detector is non-spectral and the computer is programmed with a neural network trained with the spectral profiles of a plurality of light sources including the light source to provide the output characteristic of the light source from input data corresponding to the signal produced by the light detector.

2. The system of claim 1, wherein the neural network is further trained with a plurality of input values for an optical characteristic of the light detector.

3. The system of claim 2, wherein the optical characteristic is the responsivity curve of the light detector.

4. The system of claim 1, wherein the input data for the neural network is normalized to values between 0-1.

5. The system of claim 1, further comprising a mobile device that communicates with the computer to provide the output characteristic of the light source.

6. The system of claim 5, wherein the mobile device is a handheld device.

7. The system of claim 1, wherein the light detector is a photodiode, a photomultiplier tube, a CCD array, a CMOS sensor, a thermopile, or a photovoltaic device.

8. The system of claim 1, wherein the computer communicates wirelessly with the light detector.

9. The system of claim 1, wherein the output characteristic is output power, output energy, output flux, a calculated spectrum, irradiance, or calculated light source age.

10. A method of determining an output characteristic of a light source, comprising:
    a) collecting light from a light source with a light collector and light detector to produce a signal;
    b) sending the signal to a computer programmed to determine the output characteristic of the light source; and
    c) providing the output characteristic to a user,
    wherein the light detector is non-spectral and wherein the computer is programmed with a neural network trained with the spectral profiles of a plurality of light sources including the light source.

11. The method of claim 10, wherein the computer communicates wirelessly to the light detector.

12. The method of claim 11, wherein the computer communicates wirelessly via a mobile device.

13. The method of claim 12, wherein the mobile device is a handheld device.

14. The method of claim 10, wherein the output characteristic is output power, output energy, output flux, a calculated spectrum, irradiance, or calculated light source age.

15. The method of claim 10, wherein the signal produced from the non-spectral light detector is a voltage.

16. A method of determining an output characteristic of a light source comprising:
    a) receiving a signal from light collected from a light source with a light collector and light detector; and
    b) using the signal in a computer programmed to determine the output characteristic of the light source,
    wherein the light detector is non-spectral and wherein the computer is programmed with a neural network trained with the spectral profiles of a plurality of light sources including the light source.

17. The method of claim 16, further comprising providing the output characteristic to a user.

18. The method of claim 16, wherein the output characteristic is output power, output energy, output flux, a calculated spectrum, irradiance, or calculated light source age.

* * * * *